United States Patent
Chintakrindi et al.

(10) Patent No.: US 6,216,159 B1
(45) Date of Patent: Apr. 10, 2001

(54) METHOD AND SYSTEM FOR IP ADDRESS ACCESSIBILITY TO SERVER APPLICATIONS

(75) Inventors: Rao Sivasankar Chintakrindi, Vestal; Thomas Edwin Murphy, Jr., Binghamton; Paul Francis Rieth, Apalachin; Jeffrey Scott Stevens, Endwell, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/978,252

(22) Filed: Nov. 25, 1997

(51) Int. Cl.[7] .................... G06F 15/173; G06F 15/177
(52) U.S. Cl. .................. 709/220; 709/221; 709/222; 709/223; 709/224; 709/226; 709/225; 709/227
(58) Field of Search .................. 709/220, 221, 709/223, 222, 224, 225, 219, 229, 226, 227

(56) References Cited

U.S. PATENT DOCUMENTS

| | | | |
|---|---|---|---|
| 5,371,837 | * 12/1994 | Kimber et al. | 395/114 |
| 5,450,571 | * 9/1995 | Rosekrans et al. | 395/500 |
| 5,467,434 | * 11/1995 | Hower, Jr. et al. | 395/114 |
| 5,598,536 | * 1/1997 | Slaughter, III et al. | 395/200.16 |
| 5,636,371 | 6/1997 | Yu | 395/500 |
| 5,638,497 | * 6/1997 | Kimber et al. | 395/114 |
| 5,715,379 | * 2/1998 | Pavlovic et al. | 395/112 |
| 5,734,865 | * 3/1998 | Yu | 395/500 |
| 5,790,790 | * 8/1998 | Smith et al. | 395/200.36 |
| 5,825,991 | * 10/1998 | Plakosh et al. | 395/115 |
| 5,903,716 | * 5/1999 | Kimber et al. | 395/114 |
| 5,987,376 | * 11/1999 | Olson et al. | 701/201 |

FOREIGN PATENT DOCUMENTS

WO 96/39770   6/1995   (WO) ................ H04L/29/06

OTHER PUBLICATIONS

B. Schoettle, "IP–Address Management on LANs", *Byte*, vol. 21, No. 2, pp. 199–200 (INSM Abstract 5184321, one page.)

* cited by examiner

*Primary Examiner*—Dung C. Dinh
*Assistant Examiner*—Abdullahi E. Salad
(74) *Attorney, Agent, or Firm*—Shelley M Beckstrand

(57) ABSTRACT

A Telnet server makes the IP address of a Telnet client accessible to applications by writing the IP address into device associated space initialized when the virtual device at the server is associated with the physical device at the client. Applications retrieve this device IP address using an API, and are thus enabled to do job routing, printer passthru, access control and so forth using TCP/IP networks.

8 Claims, 6 Drawing Sheets

METHOD AND SYSTEM FOR IP ADDRESS ACCESSIBILITY TO SERVER APPLICATIONS

CROSS-REFERENCES TO RELATED APPLICATIONS

U.S. Pat. applications Ser. No. 08/977,547, filed Nov. 25, 1997, entitled "System and Method for Server Virtual Printer Device Name Negotiation for Mobile Print Support", and Ser. No. 08/978,251, filed Nov. 25, 1997, "System and Method for Server Virtual Device Name Negotiation", both filed concurrently herewith are assigned to the same assignee hereof and contain subject matter related, in certain respect, to the subject matter of the present application. The above-identified patent applications are incorporated herein by reference.

BACKGROUND OF THE INVENTION

1. Technical Field of the Invention

This invention pertains to a communication system address interface to server applications. More particularly, it relates to a system and method for making the IP address of a remote Telnet client in a TCP/IP network accessible to server applications.

2. Background Art

Customers and businesses frequently use terminal emulators to attach to remote computer systems, often many remote systems at once. In TCP/IP networks, terminal emulation occurs through Telnet servers and clients. Telnet servers and clients recognize each other through their Internet Protocol (IP) addresses. (Example of an IP address: 123.456.789.012.) Businesses with TCP/IP networks often desire to have their Telnet applications be able to determine who the Telnet client is. That is, the Telnet application needs the Telnet server to somehow make the IP address of the Telnet client accessible to it.

Some systems, including the IBM AS/400 have heretofore not been able to specifically assign device names, and therefore its TCP/IP support randomly defined virtual device names, and its LUD associated space 104 has not provided a field for device address. There is, therefore, a need in the art for providing device addresses to applications on AS/400 like systems.

The system administrator of some remote server system may need to perform work management functions based upon which clients connect to it.

For example, in a first scenario, a business runs multiple computer systems in different locations (such as Paris, Rome, London) in different languages (French, Italian, English) and requires that French clients be routed to the Paris system, Italian clients to the Rome system, and so forth. A Telnet client connection to any system used by the business could optionally be routed to any other system the business desires. For example, a French client might only know the address of the Rome system, Telnet to that Rome system and have the Rome system route him to the Paris system so that he sees a French sign-on panel. In order for this to occur, the server application needs to know where the client is, meaning the IP address of the client. Inspection of the IP address can allow the application to decide which users on which networks will be routed to other systems.

In second scenario, Telnet clients often attach to a remote system (server) and create print files they would like to print on local printers, often printers attached to their (client) workstation. The remote system needs to know where the local workstation is, in order to send the print file to it. That is, the LPR protocol needs to know the IP address of the workstation. This particular problem is known in the TCP/IP environment as "printer passthru".

It is an object of the invention to provide an improved system and method for providing device addresses to applications.

It is an object of the invention to provide an improved system and method for enabling user applications in a TCP/IP environment to determine client IP addresses.

SUMMARY OF THE INVENTION

Method and system enabling a Telnet server to make the IP address of a Telnet client accessible to applications by writing the IP address into device associated space during session initialization when the virtual device at the server is associated with the physical device at the client.

In accordance with a further aspect of the invention, applications retrieve this device IP address, preferably using an API, for purposes of job routing, printer passthru, access control and so forth using TCP/IP networks.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the invention, a Telnet server makes the IP address of a Telnet client accessible to applications by storing the IP address as part of the client session information on the system. This IP address can then be retrieved as client session information by the Telnet application.

Figure 1:
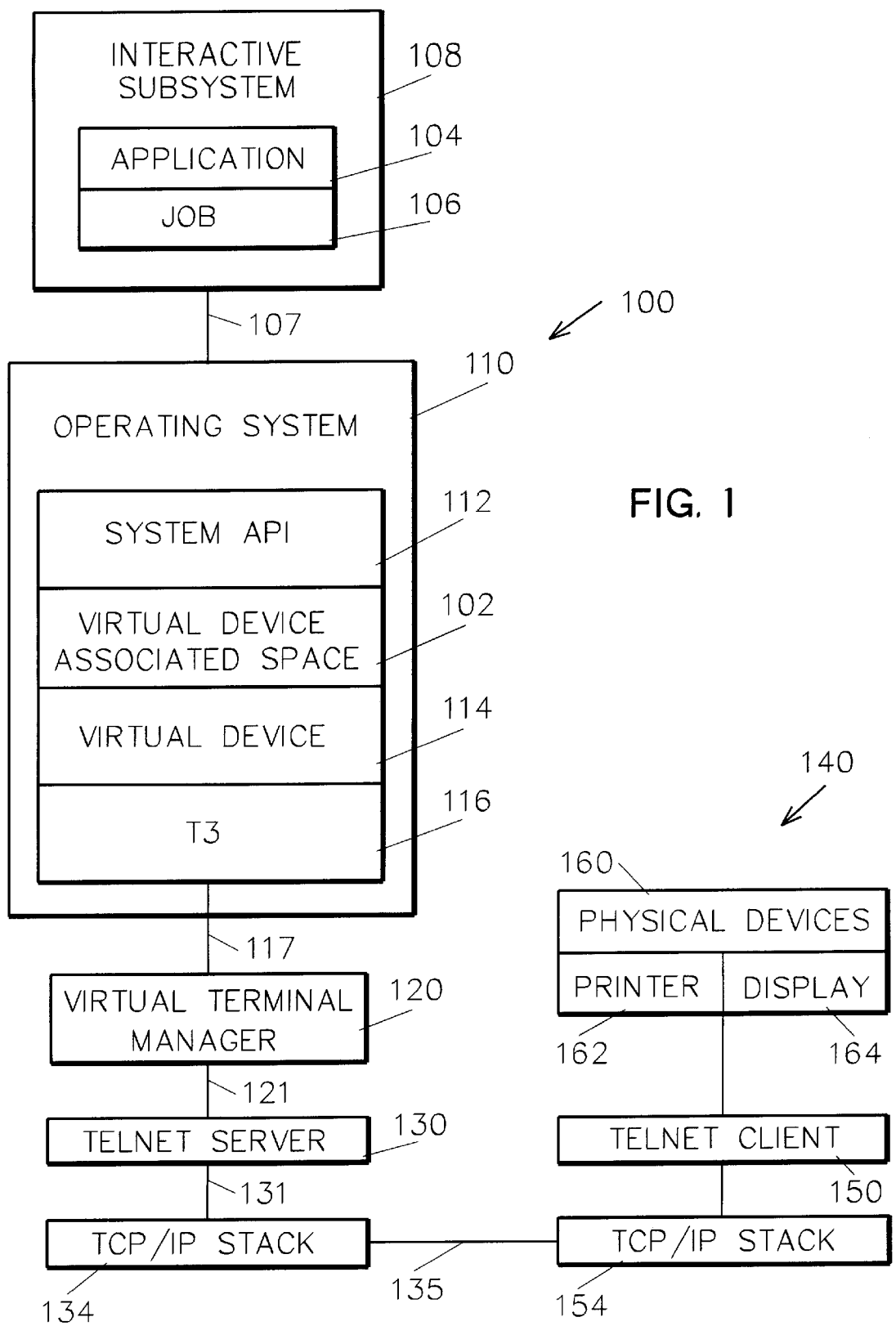
FIG. 1 is a high level block diagram illustrating the system of the invention.

Referring to FIG. 1, a typical TCP/IP client/server network is illustrated.

Server system 100 includes interactive subsystem 108, operating system 110, virtual terminal manager (VTM) 120, Telnet server (VTM/FM) 130, and TCP stack 134. Interactive (QINTER) subsystem 108 includes a plurality of applications 104 and a plurality of jobs 106. Operating system 110 includes system application program interfaces (API's) 112, virtual devices 114, virtual device associated space 102, also referred to as logical unit descriptor (LUD) associated space 102, and transmit to terminal (T3) 116.

Client system 140 includes a Telnet client processor 150 with attached physical devices 160, including a printer 162 and display 164, and communicates via TCP/IP stack 154 with server 100 over TCP/IP network 135.

Telnet client 140 may use standard Internet/intranet protocols, such as are described in various Requests for Comments (RFC's) to request a virtual device 114 on behalf of its client 150. These virtual devices 114 represent a particular physical device 160 (display 164, printer 162, or the like) that exists on the client system 140. If the virtual device 114 does not exist, it is created. When this virtual device is selected or created, the Telnet server system's operating system 110 writes the IP address of the client 140 into device associated space 102. The virtual device may be assigned by the Telnet server OS 110; or, in accordance with the invention described in U.S. Pat. application Ser. No. 08/978,251, a specific IP address may be negotiated by the Telnet client 140.

Thereafter, the Telnet application 104, such as LPR, work management, or so forth, can automatically retrieve the IP address of the client using, for example, a system application programming interface (API) 112. Using the IP address thus retrieved, applications 104 for job routing, printer passthru, access control and so forth may use TCP/IP networks 135. In accordance with the present invention, a client IP address is available to applications 104 having dependency on that client IP address or having a need to associate the client IP address with a physical location.

In accordance with a preferred embodiment of the invention, application 104 print support is provided for controlling and directing printing over TCP/IP networks. In particular, dynamic print support is provided for clients 140 with variable internet protocol (IP) addresses. This support is supplied in the form of a system API 112 enhancement that allows application 104 to retrieve the IP address of the Telnet client from space 102.

Without knowing the location of client 140, server 100 does not know where to send print files. Of course, client 140 knows where it is located, but application 104 does not. In the past, client 140 had to determine where to send print output, but with this invention application 104 is enabled to do so.

Traditional applications 104 have determined individual client 140 locations by inspecting the virtual device name used by a client. Such applications were limited to SNA-based or other such "pass thru" connections. TCP/IP-based clients 140 (aside from IBM network Stations) lack the ability to select the name of a virtual device 114, and are instead assigned a random virtual device 114. Therefore, the next best way to identify the TCP/IP client 140 location is by its IP address. In accordance with a preferred embodiment of this invention, the IBM AS/400 Telnet server 130 stores the client IP address in the virtual device description in virtual device associated space 102 at the location defined by an address pointer provided to server 130 by the operating system 110 when the associated virtual device 114 was created. Traditional applications can now retrieve this IP address by inspecting the virtual device description using an existing system API. And this can be done whether the virtual device is randomly assigned by the server or negotiated with the client.

If a user moves to a different physical location, application 104 can print out to the printer 162 at the IP address from which the user logged on. Further, application 104 can check LUD associated space 104 which, in effect, contains a data base associating internet protocol (IP) addresses with physical locations, and check if the user is authorized to run this application 104 from this terminal 140 IP address, or transfer job 106 to another subsystem, or change national languages, and so forth.

In broad overview, in accordance with the method of the invention, the following steps occur.
1. A server 100 client 140 dialog initializes a session, during which device type, end-of-record processing, binary mode are negotiated.
2. Telnet server (VTM/FM) alerts operating system 110 of the session.
3. Operating system 110 (a) gives client 140 a sign on screen; (b) retrieves from a pool of virtual device names a virtual device 114 associated with (or created to associate with) physical device 160; (c) simulates a power on to that virtual device 114; and (d) establishes addressibility to space in LUD associated space 102 for this virtual device 114.
4. Client 140 provides its IP address, which comes to server 100 as part of the connection (or socket address structure) process (address structure.)
5. Operating system 110 stores the socket include files in LUD associated space 102 for the virtual device associated with a physical device 160 at this client 140. This LUD associated space 102 is available only to programmers, such as programmers of application programs 104 and operating system 110.

Application programs 104, running under a job 106, thereafter check LUD associate space 102 using a system API 112 for the IP address of client 140, and with reference to the IP address determine, for example, if it will print to virtual device 114, knowing that it is intended for physical printer 162. Application program 104 is thus enabled to choose to refuse to print out sensitive payroll information to a physical device 162 that is not located in a secure room, or to execute a payroll application only in response to requests from a client 150 at a particular physical location. Table 1 illustrates a typical application 104 code segment for accessing LUD associated space for the IP address.

TABLE 1

APPLICATION 104 CODE SEGMENT

| | |
|---|---|
| QSYRUSRI (current job) | -> default output queue 270 |
| QUSRJOBI (current job) | -> output is DEVNAME 266 |
| QDCRDEVD (DEVNAME) | -> output is IP Address 250 |
| IF QNAME == USERNAME | */ queue name 272 equals |
| | */ user name 262 in name |
| | */ compare structure 278 |
| IF IPADDR EXISTS IN MAP | */ If IP addr 250 found in |
| THEN CHGOUTQ (override call) | |
| | */ MAP in 280 by address |
| | */ compare 286, then apply |
| | */ overrides 282 and 284 |
| | */ information |

The QUSRJOBI system API 112 (Retrieve Job Information) retrieves specific information about jobs. QUSRJOBI requires five parameters, and allows for one optional parameter, as follows:

| | | | |
|---|---|---|---|
| 1. | Receiver variable | Output | Char(*) |
| 2. | Length of receiver variable | Input | Binary(4) |
| 3. | Format name | Input | Char(8) |
| 4. | Qualified job name | Input | Char(26) |
| 5. | Internal job identifier | Input | Char(16) |
| 6. | Error code (optional) | I/O | Char(*) |

The qualified job name includes (a) job name, the job 106 that this application program 104 is running in; (b) user name; and (c) job number, a specific number for this job 106, or blank in certain cases not herein relevant.

Several format names are provided, including JOBI0100, which contains information valid for active jobs 106 and jobs 106 on queues. Job format JOBI0100 returns the following information: job name (which is also device name), user name, job number, job status, job type, and the like. Job name is the name of job 106 as identified to system 110. For an interactive job 106, system 110 assigns the job name of the work station 140 where the job started. For a batch job 106, the job name is specified in the command starting the job.

QDCRDEVD

The QDCRDEVD System API 112 (Retrieve Device Description) provides the IP address of Telnet client 140 to application 104 from LUD space 102. The QDCRDEVD API 112 has the following required parameters:

| | | | |
|---|---|---|---|
| 1. | Receiver variable. | Output | Char(*) |
| 2. | Length of receiver variable | Input | Binary(4) |
| 3. | Format name | Input | Char(8) |
| 4. | Device name | Input | Char(10) |
| 5. | Error code | I/O | Char(*) |

The device name is the name of the device description to be retrieved. The possible format names include DEVD0600, a format which returns detailed information about a device of category "display" (*DSP), and includes fields which specify the network protocol, the network protocol address, and the Internet Protocol (IP) internet address in dotted decimal form. A unique IP internet address is assigned to each system on a TCP/IP network. In accordance with the preferred embodiment, the DEVD0600 IP internet address field applies to a display 164 or DEVD0600 for *PRT or printer 162 that is used by Telnet over TCP/IP.

As previously discussed, the client 140 IP address is provided during session initialization. In accordance with a preferred embodiment of the invention, during session initialization (socket connection), client 140 defines its IP address structure using <sockets.h>, a programming entity called a header file, which defines Table 2 and which server 130 writes into LUD space 102 as a socket address structure. For example, for client 140 sockets that use an address family of AF_INET, the internet address structure sockaddr_in requires a 2-byte port number and a 32-bit IP address. Client 140 can have system 100 automatically select a port number by setting the port number to 0. In Table 2, a code segment illustrates the IP address structure.

TABLE 2

IP ADDRESS STRUCTURE

```
struct sockaddr_in {
    short       sin_family;
    u_short     sin_port;
    struct      in_addr sin_addr;
    char        sin_zero[8];
};
``` from sockets.h header file, where sin_family is the address family (always AF_INET for TCP and UDP), sin_port is the port number, and sin_addr is the internet address. The sin-zero field is reserved and must be hex zeros.

IP addressing is subject to corruption by firewalls and other tools that mask or manipulate IP addresses to appear other than the true Internet address. Consequently, IP addresses are only confidently genuine in a protected or local intranet, or in a TCP/IP network 135 where address validity is maintained.

By using the QDCRDEVD API 112, application 104 maps the IP address of individual clients 140 to particular printers 162. This allows application 104 to control where and how print files are sent. This mapping can control sending print files back to the client's workstation 140, to a network printer (on network 135), or even to a printer on the application system 100. This is done by using Remote Output Queue support functions. A variety of application 104-controlled printing options are provided to restrict, track or reroute print files as particular business needs dictate.

Referring to FIGS. 2 and 3A through 3D in connection with Tables 3 through 6, an example of an application program is set forth which uses the IP address which is stored in device associated space 102 by Telnet 130 whenever a client 140 connects to server 100 and can be read by application 104 using the QDCRDEVD API 112.

Figure 2:
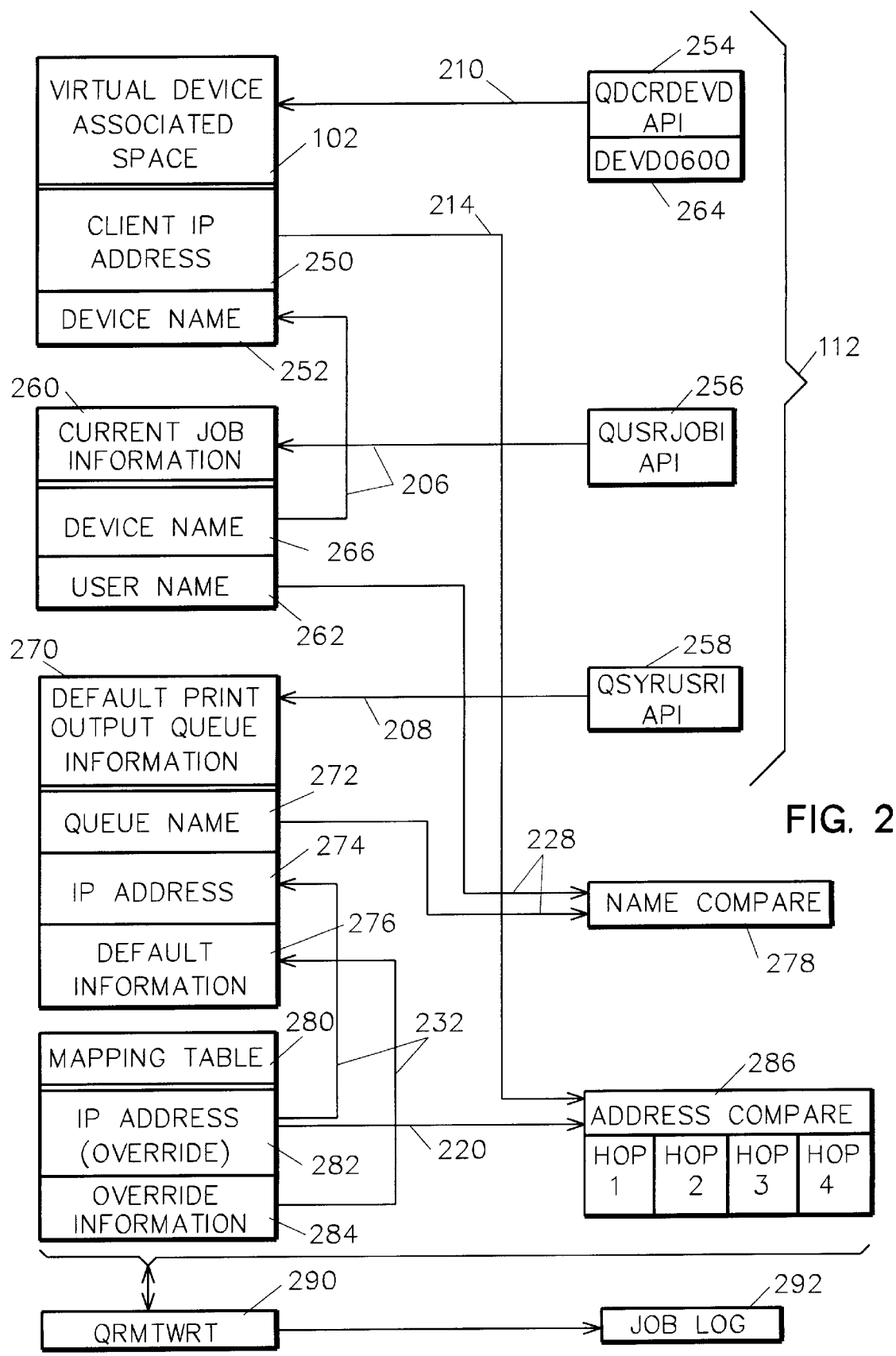
FIG. 2 is a block diagram illustrating some of selected program structures for an example of a specific application program's use of the system and method of the invention.
Figure 3A:
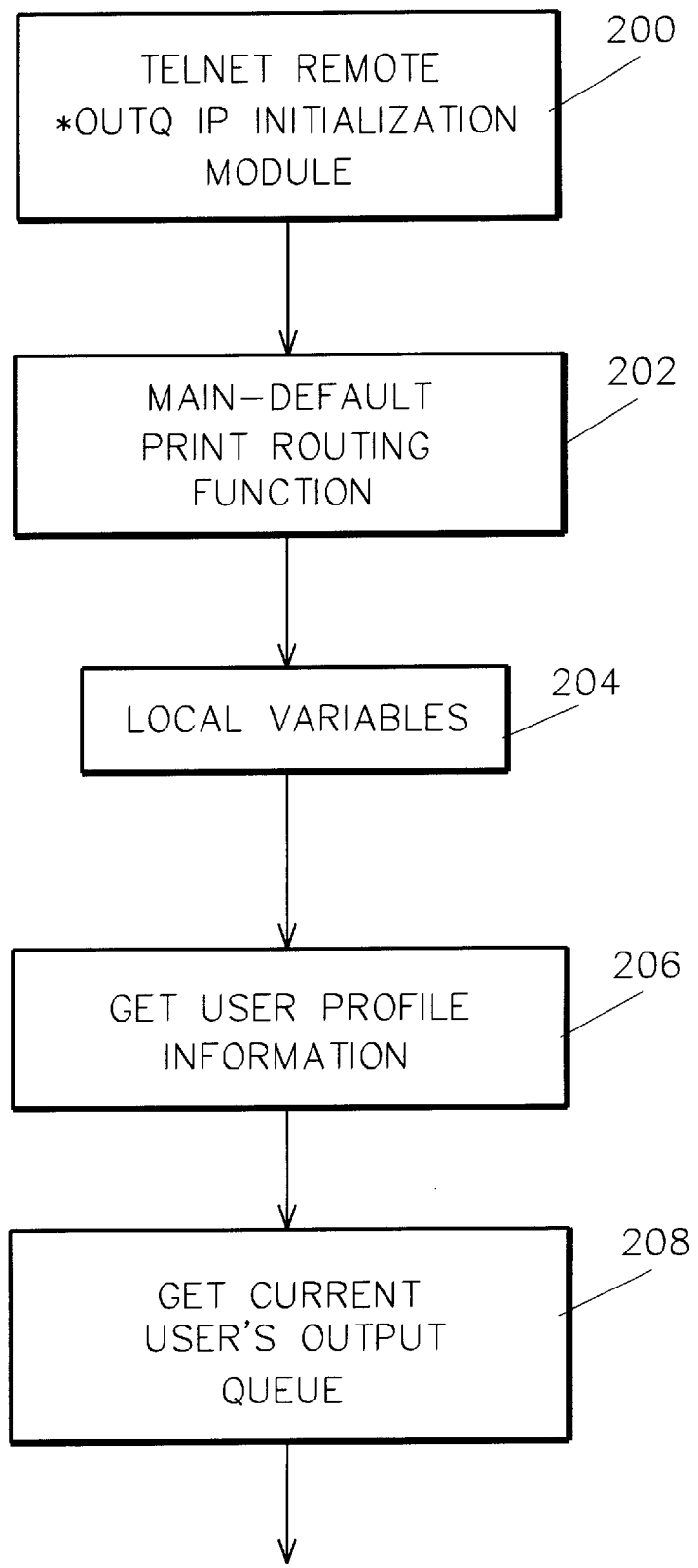
FIGS. 3A through 3D, aligned as illustrated in FIG. 3 represent the process flow of the specific example of FIG. 2.
Figure 3B:
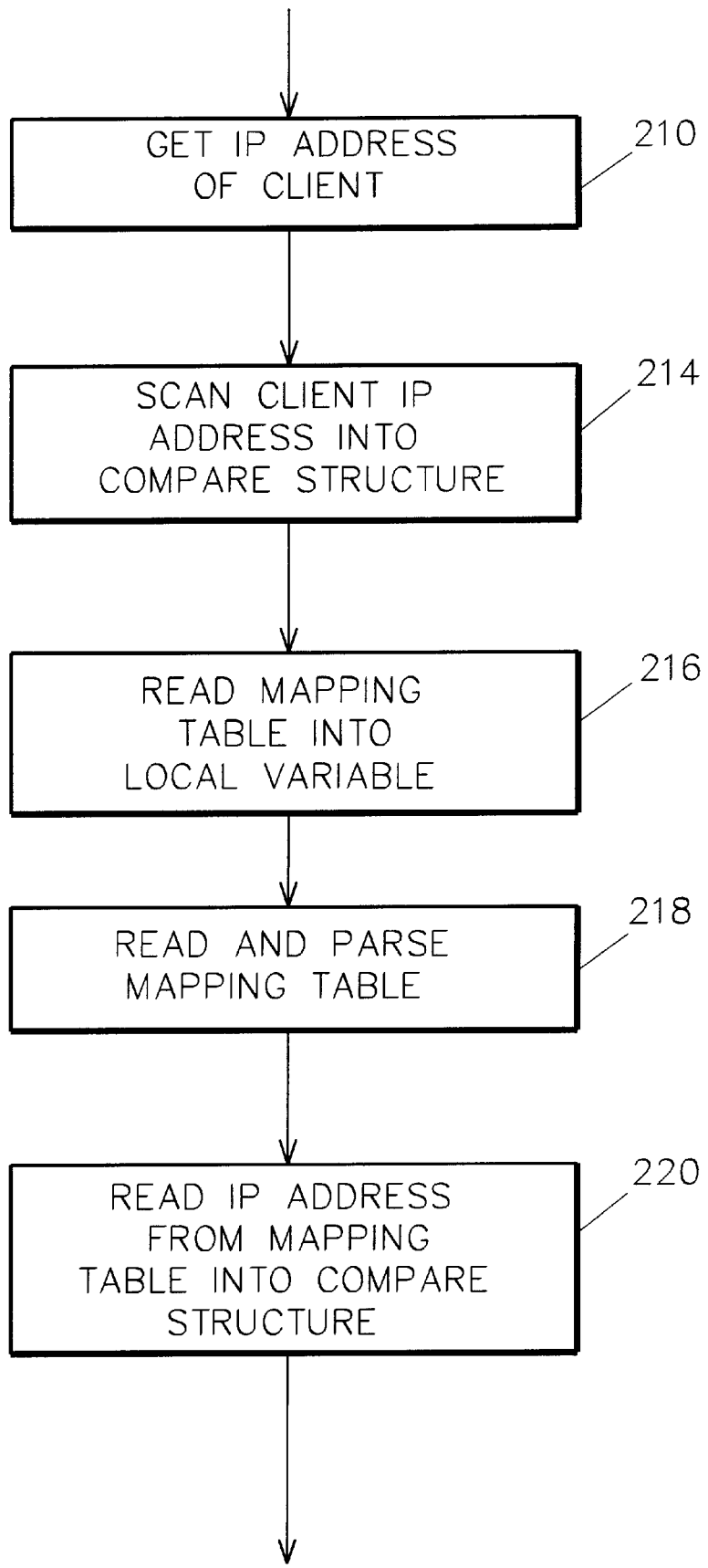
Figure 3C:
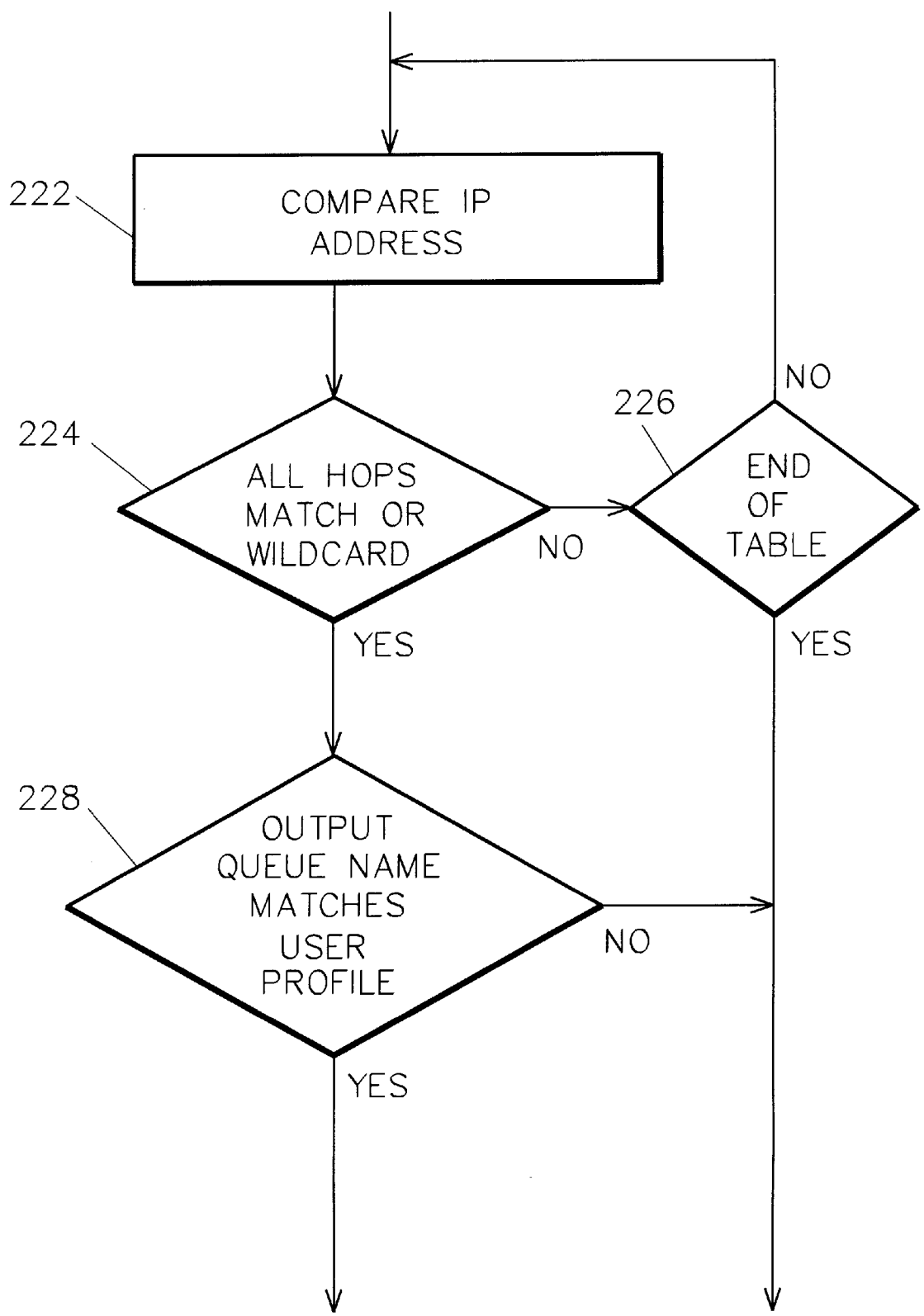
Figure 3D:
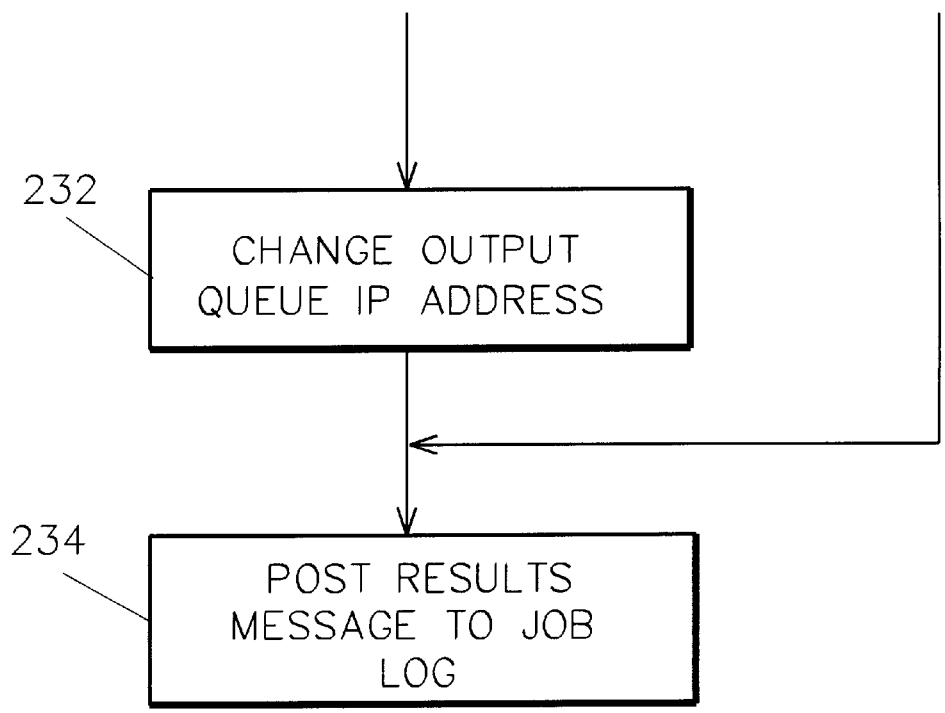
Figure 3:
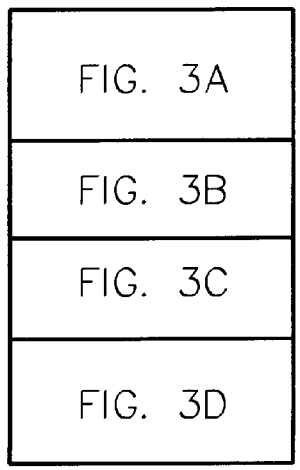

Referring to FIG. 2, in accordance with this example for use of the system of the invention, several programming structures are provided, including virtual device associated space 102, having stored therein during session initialization client IP address 250 identified by user name 252; current job information 260, including user name 262 and default print output queue 270, which includes queue name 272; application program interfaces (APIs) QDCRDEVD 254, QUSRJOBI 256, QSYRUSRI 258; DEVD0600 264. Specific to this example are the following programming structures: mapping table 280 including IP address 282 and override information 284; application program QRMTWRT 290; job log 292; name compare module 278, and address compare module 286. The interrelationship of these programming structures will be further described in connection with process flow diagrams 3A through 3D, with selected program steps 200–234 in FIGS. 3A through 3D being represented, where applicable, by corresponding lines in FIG. 2.

Referring to FIGS. 3A through 3D, by way of overview, this specific application QRMTWRT contains functions to allow Telnet clients to sign-on to an AS/400 system, and optionally set the queue name 272 and IP address 274 of the default print output queue 270 based upon their workstation IP address 250. A mapping table 280 is used to associate printer information 282, 284 with client IP address 250. If the default queue name 272 is not the same as the user profile name 262, the program exits. If the output queue name 272 matches the user profile name 262, then the IP address 274 and default information 276 is changed to the values of IP address 282 and override information 284 from mapping table 280. In tables associated with this example, the IP address 282 is represented by 'x.x.x.x', and override information 284 includes 'printer', 'mfgtype', 'desttype' and 'xform' values. If no entry is found in mapping table 280, the program exits without changing default print output queue 270.

In step 200, the Telnet session is initialized, which includes setting the IP address 250 of user 262 (associated with device name 252) into virtual device associated space 102. Once the session connection is established, a job 106 is executed on behalf of user 262, and that job may call several applications 104, including the application QRMTWRT 290 of this example. Step 202 represents the call by job 106 to this specific application program 104, QRMTWRT 290.

In step 204, QRMTWRT 290 defines local variables essential to its function, which is to use the IP address 250 of Telnet client 140, obtained using QDCRDEVD API 254, to set up the default print device 114/162 for the terminal session. The print device 114/162 is selected using mapping table 280, with client IP address 250 being used as an index. Mapping table 280 indicates the remote output queue name 272 and IP address 274. The purpose is to illustrate how an application 104/290 routes printing over TCP/IP network 135 using the client IP address 250 to determine what printer 162 is local to that client 140, or to a secure printer 162 for certain clients 140, such as Payroll.

In step 206, using API QUSRJOBI 256, using the special request of '*CURRENT' on the API call, user name 262 and device name 266 are obtained from user profile 260 for current job 106. This device name 266 is used to access virtual device associated space in step 210. This user name 262 is the default user name which will be compared later with the default output queue name 272. In the example of Table 3, assume the default name is "STEVENS".

In step 208, using API QSYRUSRI 258, the default output queue 270 for current user 262 is obtained, using the special value of "*CURRENT" on the API call. This provides the queue name 272 of output queue 270 which will be compared with the user name 262 obtained in step 206.

In step 210, using API QDCRDEVD 254 with the device name 266 obtained in step 206 to search user names 252, the client IP address 250 associated with user name 262 is obtained. This IP address 250 will be used to match this user 262 with an entry in default print output queue table 270, by matching in code module 286 client IP address 250 with IP address field 274. In this embodiment, if QDCRDEVD 254 returns an empty IP address 250, TCP/IP is not being used and the program exits.

In step 214, client IP address 250 is scanned into address compare structure 286.

In step 216, mapping table 280 is read into a local variable, to be read and parsed in step 218. Map table 280 is illustrated in Table 3, and represents a *FILE object on an IBM AS/400 system that is read by QRMTWRT application 290 to determine whether or not to override the default 270 in user profile 260.

In step 220, IP address 282 is read from mapping table 280 into compare structure 286. In steps 214 and 220, in this embodiment, as IP addresses 214 and 282 are read into compare structure 286, they are broken into four individual 'hops' for comparison. By comparing hops, printing for individual Telnet clients 140 or all clients on a specific subnet 135 can be controlled.

In step 222, IP addresses 250 and 282 are compared. Under control of steps 224 and 226, this comparision step 222 is repeated for successive entries in mapping table 280 until all entries have been compared without a match, or until a match is found. Starting with the first entry in table 280, all four hops from both client IP address 250 and MAP table IP address 282 are compared for matches. A wildcard character '*' is used to allow any value for a particular hop. If no matching template (address pair) is found, the next line in mapping table 280 is read and compared.

In step 228, output queue name 272 and user profile name 262 for this session are compared. They must match in order to avoid changing customized output queues.

In step 232, if a matching IP address template is found in step 222 and names 262 and 272 match in step 228, then that entry's override information field 284 is used to define how the output queue IP address 274 and default information 276 in default output queue 270 is to be modified for this client 262. Since mapping table 280 is being processed from top to bottom, to expedite processing more specific IP addresses 282 are placed ahead of any IP addresses with wildcard mappings.

Table 3 is an example of a mapping table 280 of user profiles for a set of three system users. In Tables 4 through 6, example user-to-printer mapping program commands are set forth for providing user profiles at signon, including defining default output queues for each client, thus making printer configuration and setup automatic and invisible to the user. Using mapping table 280 to build a change output queue CHGOUTQ command, the default output queue 270 for a connected client 262 is modified.

TABLE 3

DEFAULT USER PROFILES EXAMPLE

| # | Client IP Address Mapping Rules: |
|---|---|
| # | |
| #1. | A '*' character can be used as a wildcard in IP address |
| # | hops. |
| #2. | *CLIENT for the printer IP field means substitute the |
| # | client IP. |
| #3. | DestType must be: *SAME or a valid DESTTYPE parameter |
| # | value. |
| #4. | Xform must be: *SAME or a valid TRANSFORM parameter |
| # | value. |
| #5. | Type/Model must be: *SAME or a valid MFRTYPMDL |
| # | parameter value. |
| #6. | Any line with a '#' in column 1 is a comment line |
| #7. | Cases sensitivity is maintained when file is read. |
| #8. | A '|' vertical bar is used as a field delimiter. |
| #9. | Any field with a '#' means to use blanks as the value. |

| Printer | PrintIp | ClientIP | User | DestType | Xform | Type/Model |
|---|---|---|---|---|---|---|
| hpjet | 5.6.7.22 | 5.6.7.* | STEVENS | *OTHER | *YES | *HP560C |
| QPRINT | 5.6.7.23 | 5.6.8.* | QUSER | *OS400 | *NO | *IBM4029 |
| LPTL | *CLIENT | *.*.*.* | MURPHY | *OTHER | *YES | *IBM42011 | where Printer, PrintIp, DestType, Xform and Type/Model represent override information on the CHGOUTQ commmand, and ClientIP is the search index.

TABLE 4

FIRST CLIENT

Client 5.6.7.8 is at the office on subnet 5.6.7.*. All clients on subnet 5.6.7.* want printouts on local network printer 'hpjet' at 5.6.7.22. The user-to-printer mapping program modifies the default *OUTQ for client 5.6.7.8 with the command:
CHGOUTQ OUTQ(default) RMTSYS('5.6.7.22')
RMTPRTQ('HPJET') AUTOSTRWTR(1) CNNTYPE(*IP)
TRANSFORM(*YES) MFRTYPMDL(*HP560C) DESTTYPE(*OTHER)

TABLE 5

SECOND CLIENT

Clients on subnet 5.6.8.* handle confidential information and require a graphics printer that supports overlays (IFPDS type spooled files). All clients on subnet 5.6.8.* want printouts to secured printer QPRINT at 5.6.7.23. The user-to-printer mapping program modifies the default *OUTQ for this client with the command:
CHGOUTQ OUTQ(default) RMTSYS('5.6.7.23')
RMTPRTQ('QPRINT') AUTOSTRWTR(1) CNNTYPE (*IP)
TRANSFORM(*NO) MFRTYPMDL(*IBM4029) DESTTYPE(*OS400)

TABLE 6

THIRD CLIENT

Client 1.2.3.4 is located at home and is using an Internet Service Provider (SP). This person wants printouts sent to the LPD server running on his workstation. A catchall entry of all wildcards could be used for ISP clients, with the printer IP address mapped to be the same as the client workstation. The user-to-printer mapping program modifies the default *OUTQ for this client with the command:
CHGOUTQ OUTQ(default) RMTSYS('1.2.3.4') RMTPRTQ('hpjet')
AUTOSTRWTR(1) CNNTYPE (*IP) TRANSFORM(*YES)
MFRTYPMDL(*IBM42011) DESTTYPE (*OTHER)

ADVANTAGES OF THE PRIOR ART

It is an advantage of the invention an improved system and method for providing device address to applications is provided; and, more specifically, that user applications in a TCP/IP environment are enabled to determine client IP addresses.

It is a further advantage of the invention that applications have access to device IP addresses for purposes of job routing, printer passthru, access control and so forth using TCP/IP networks.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

What is claimed is:

1. Method for enabling a server to make the network address of a physical device at end client local workstation accessible to applications, comprising the steps:
    associating a virtual device at said server with said network address of said physical device at said end client local workstation;
    initializing virtual device associate space in the application layer of a network also including transport layer;
    writing said network address of said physical device at said end client local workstation into said virtual device associated space; and
    retrieving said network address of said physical device at said end client local workstation for use by said applications thereby enabling said applications to make processing decisions based upon the physical location of said client local workstation.

2. The method of claim 1, comprising the further step of:
    executing said application to do at least one of job routing, printer passthru, and access control using TCP/IP networks.

3. The method of claim 1, comprising the further steps of operating said applications responsive to said network address for controlling and directing printing over TCP/IP networks to clients with variable network addresses.

4. A program storage device readable by a machine, tangibly embodying a program of instructions executable by a machine to perform method steps for enabling a server to make the network address of a physical device at an end client local workstation accessible to applications, said method steps comprising:
    associating a virtual device at said server with said network address of said physical device at said end client local workstation;
    initializing virtual device associate space;
    writing said network address of said physical device at said end client local workstation into said virtual device associated space; and
    retrieving said network address of said physical device at said end client local workstation for use by said application thereby enabling said application to make processing decisions based upon the physical location of said client local workstation.

5. An article of manufacture comprising:
    a computer usable medium having computer readable program code means embodied therein for enabling a server to make the network address of a physical device at an end client local workstation accessible to applications, the computer readable program means in said article of manufacture comprising:
        computer readable program code means for causing a computer to effect associating a virtual device at said server with said network address of said physical device at client local workstation;
        computer readable program code means for causing a computer to effect initializing virtual device associate space;
        computer readable program code means for causing a computer to effect writing said network address of said physical device at said end client local workstation into said virtual device associated space; and
        computer readable program code means for causing a computer to effect retrieving said network address of said physical device at said end client local workstation for use by said application thereby enabling said application to make processing decisions based upon the physical location of said client local workstation.

6. System for enabling a server to make the network address of a physical device at an end client local workstation accessible to applications, comprising:
    means for associating a virtual device at said server with said network address of said physical device at said client local workstation;
    means for initializing virtual device associate space;
    means for writing said network address of said physical device at said client local workstation into said virtual device associated space; and
    means for retrieving said network address of said physical device at said client local workstation for use by said applications thereby enabling said applications to make processing decisions based upon the physical location of said client local workstation.

7. Method for communicating to an application at a server system the network address of physical device at an end client machine, comprising the steps of:

associating a virtual device at said server system with said network address of said physical device at said end client machine;

initializing virtual device associate space;

writing said network address of said physical device at said end client machine into said virtual device associated space; and retrieving said network address of said physical device at said end client machine for use by said application thereby enabling said application to make processing decisions, based upon the physical location of said client local workstation.

8. A program storage device readable by a machine, tangibly employing a program of instructions executable by a machine to perform method steps for enabling access by an application at a server system to a client workstation, said method steps comprising:

associating a virtual device at said server with a network address of a physical device said client workstation;

initializing virtual device associate space;

writing said network address of said physical device at said client workstation into said virtual device associated space; and retrieving said network address of said physical at said client workstation for use by said application thereby enabling said application to make processing decisions, based upon the physical location of said client local workstation.

* * * * *